(12) United States Patent
Baldsiefen et al.

(10) Patent No.: US 9,914,401 B2
(45) Date of Patent: Mar. 13, 2018

(54) LOAD CARRIER FOR MOTOR VEHICLES, IN PARTICULAR IN THE FORM OF A ROOF RACK

(71) Applicant: FORD GLOBAL TECHNOLOGIES, LLC, Dearborn, MI (US)

(72) Inventors: Lothar Baldsiefen, Nordrhein-Westfalen (DE); Dino Valter, Duren (DE); Rene A. Huth, Lohmar (DE)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 14/803,674

(22) Filed: Jul. 20, 2015

(65) Prior Publication Data
US 2016/0023612 A1 Jan. 28, 2016

(30) Foreign Application Priority Data
Jul. 22, 2014 (DE) .................. 10 2014 214 199

(51) Int. Cl.
*B60R 9/08* (2006.01)
*B60R 9/052* (2006.01)
*B60R 9/045* (2006.01)
*B60R 9/048* (2006.01)

(52) U.S. Cl.
CPC .............. *B60R 9/045* (2013.01); *B60R 9/048* (2013.01)

(58) Field of Classification Search
CPC B60R 9/048; B60R 9/045; B60R 9/08; B60R 9/052

USPC .............. 224/324–326, 329, 323, 924
See application file for complete search history.

(56) References Cited

U.S. PATENT DOCUMENTS

| 2,434,387 | A | * | 1/1948 | Brandt | B60R 9/045 |
| | | | | | 224/323 |
| 2,788,929 | A | * | 4/1957 | Gallagher | B60P 7/06 |
| | | | | | 224/323 |
| 3,877,624 | A | * | 4/1975 | Carson | B60R 9/0485 |
| | | | | | 224/323 |
| 4,358,037 | A | | 11/1982 | Heideman | |

(Continued)

FOREIGN PATENT DOCUMENTS

| DE | 202005011117 U1 | 9/2005 |
| EP | 2035258 B1 | 3/2009 |

(Continued)

OTHER PUBLICATIONS

English Translation of FR1268891(A).

*Primary Examiner* — Brian D Nash
(74) *Attorney, Agent, or Firm* — Jason Rogers; King & Schickli, PLLC

(57) ABSTRACT

The invention relates to a load carrier for motor vehicles, in particular in the form of a roof rack, consisting of at least two carrier bridges arranged offset at a distance from one another in the longitudinal direction of the vehicle. The carrier bridges in each case comprise a crossbar as well as fastening feet which are able to be mounted on both sides of the vehicle. The angle brackets serve as lateral load stops on the crossbars. The angle brackets are able to be pivoted back and forth between an active, open position and an inactive, closed position in which they do not produce air turbulence and thus effect additional travel noise.

18 Claims, 2 Drawing Sheets

(56) References Cited

U.S. PATENT DOCUMENTS

| | | | | |
|---|---|---|---|---|
| 4,972,983 | A | * | 11/1990 | Bott .......................... B60R 9/00 |
| | | | | 224/316 |
| 5,009,350 | A | * | 4/1991 | Schill .................... B60R 9/0485 |
| | | | | 182/127 |
| 5,076,479 | A | | 12/1991 | Davison |
| 8,113,397 | B2 | * | 2/2012 | Magnusson ............. B60R 9/048 |
| | | | | 224/321 |
| 9,079,541 | B2 | * | 7/2015 | Farber ....................... B60R 9/08 |
| 2013/0193176 | A1 | * | 8/2013 | Khoo ...................... B60R 9/048 |
| | | | | 224/324 |
| 2015/0076197 | A1 | * | 3/2015 | Sautter ................... B60R 9/045 |
| | | | | 224/324 |

FOREIGN PATENT DOCUMENTS

| | | | |
|---|---|---|---|
| FR | 1268891 | A | 8/1961 |
| FR | 2989338 | A1 | 10/2013 |
| JP | H11170919 | A | 6/1999 |

\* cited by examiner

LOAD CARRIER FOR MOTOR VEHICLES, IN PARTICULAR IN THE FORM OF A ROOF RACK

TECHNICAL FIELD

This document relates generally to the motor vehicle equipment field and, more particularly, to a load carrier for motor vehicles in the form of a roof rack, consisting of at least two carrier bridges arranged offset at a distance from one another in the longitudinal direction of the vehicle. In each case, the carrier bridges comprise a crossbar as well as fastening feet which are able to be mounted on both sides of the vehicle. Angle brackets serve as lateral load stops on the crossbars. The angle brackets are able to be pivoted between an active and an inactive position.

BACKGROUND

In a known load carrier of the aforementioned type (EP 2 035 258 B1) angle brackets are provided which are not able to be pivoted in the lateral direction. If the angle brackets are not required, they may be folded to the rear behind the respective crossbar into an inactive position. Since the angle brackets in their inactive position are then located in the same horizontal plane as the crossbars, air turbulence when the vehicle is moving produces considerable noise which is unpleasant for the vehicle occupants.

In a further load carrier of the aforementioned type (FR 2 989 338 A1) the angle brackets are pivotably arranged at the top on the crossbars, and must be fixed in their active and inactive positions by a U-shaped clamp. Although, in the inactive position, the respective angle bracket bears at the top against the respective crossbar, it protrudes upwardly considerably beyond the profile of the respective crossbar and thus represents additional air resistance which leads to air turbulence and unpleasant travel noise.

The object of the invention, therefore, is to provide a load carrier which combines the advantages of the known load carriers, namely the high degree of stability of the angle brackets, while also offering the possibility of bringing the angle brackets into an inactive position in such a way as to not protrude significantly over the profile of the crossbars, thus avoiding additional air turbulence and reducing travel noise associated therewith.

SUMMARY

In accordance with the purposes and benefits described herein, a bridge for a motor vehicle load carrier is provided. That load carrier consists of at least two such carrier bridges comprising a crossbar and fastening feet, the crossbars being provided with angle brackets serving the function of lateral load stops.

In particular, the angle brackets comprise two fastening limbs encompassing the crossbar, in that the fastening limbs are able to be pivoted about a common pivot pin provided on the crossbar. In their active or open position, the angle brackets are oriented vertically against a stop; in their inactive or closed position, the angle brackets are folded down onto the crossbar such that they bear against the crossbar.

Such an arrangement represents the simplest and least complicated variant of the bridge. In the majority of applications, it is not necessary to secure the angle brackets in the direction of the inactive position, since it is frequently sufficient to limit the maximum folded-up position of the angle brackets, in which the angle brackets face upwardly. In the direction of the inactive position of the angle brackets, the movement is normally prevented by the transported load. If the angle brackets are not required and are able to adopt their inactive position, they bear flat against the respective crossbar and do not represent any substantial additional air resistance.

In another possible embodiment, the angle brackets may be configured with the substantially vertically extending front and rear faces of the crossbars such that the angle brackets have an approximately U-shaped cross-section with a crossmember and arms of the U-shape adjacent thereto. In that configuration, the arms of the U-shape in the inactive position of the angle brackets encompass the front and rear faces of the crossbar, flush therewith, whilst the crossmember bears against the upper face of the crossbar. In such a design, the angle brackets fit closely against the contour of the crossbars and only protrude by the thickness of their sheet metal over the outer contour of the crossbars.

In such an embodiment, the end edge of the crossmember facing the fastening limbs may serve as a stop for limiting the movement of the angle brackets in their active position, inasmuch as the end edge in the active position of the respective angle bracket bears against the upper face of the crossbar. The end edge, which is provided in the cross section of the angle brackets, is automatically produced when cutting off the fastening limbs, so that a specific stop element is not required.

In yet another possible embodiment, a transverse pin arranged in the respective crossbar and able to be fastened therein may be provided as a pivot pin for the fastening limbs. In such an embodiment, that transverse pin may protrude over the front and rear faces of the crossbar, wherein the protruding portions of the transverse pin engage in corresponding recesses of the fastening limbs of the angle brackets, forming a rotary joint. The angle brackets are then able to be pivoted about this crossmember.

In an alternative embodiment, rotary pins inserted on both sides into the respective crossbar may also be provided as a pivot pin for the fastening limbs. The rotary pins protrude over the front and rear faces of the respective crossbar, wherein the protruding portions of the rotary pins engage in corresponding recesses of the fastening limbs of the angle brackets, forming a rotary joint. The rotary pins may in this case be screwed laterally from the outside into the respective crossbar, so that the mounting is particularly simplified as a result.

In another possible embodiment, the fastening limbs may have on at least one side an additional recess, a spring-loaded securing pin provided in the crossbar engaging therein when the angle brackets adopt their active position. The purpose of this pin is to secure the angle brackets additionally in the direction of their inactive position. In order to bring the angle brackets into their active position, the angle brackets are pivoted upwardly sufficiently far until the securing pin engages in the additional recess and the respective angle bracket adopts its active position, in which it is secured on both sides. In order to be pivoted back into the inactive position, the securing pin only needs to be depressed so that the angle brackets may then be pivoted into their inactive position.

Further, a plurality of similar pivot pins and, optionally, securing pins may be provided. The pins are distributed over the length of the crossbars, so that the angle brackets are able to be articulated at different points of the crossbar.

A particularly preferred embodiment of the invention is that the recesses of the fastening limbs are configured as sliding slots in the form of elongated holes which extend in the longitudinal direction of the angle brackets. Together with the respective pivot pin, these holes form a rotary joint, such that a stabilizing pin is arranged on the crossbar below the pivot pin. The stabilizing pin engages in a second elongated hole which extends aligned with the sliding slot and/or first elongated hole and has at least the same length as the sliding slot and/or first elongated hole and in that from the lower end of the second elongated hole extends a circular arc-shaped elongated hole of the same width. The circular arc-shaped elongated hole extends at least over a circular arc of 90° in the direction of the inactive position of the angle bracket.

Also in this embodiment, in order to be able to attach the angle brackets to different points of the crossbar, the crossbar comprises a plurality of pivot pins and stabilizing pins distributed over its length so that the angle brackets are able to be articulated at the corresponding points of the crossbar according to the respective application.

In the following description, there are shown and described several preferred embodiments of the load carrier and its associated angle brackets. As it should be realized, the load carrier and its associated angle brackets are capable of other, different embodiments and their several details are capable of modification in various, obvious aspects all without departing from the load carrier and angle brackets as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the load carrier and its associated angle brackets and together with the description serve to explain certain principles thereof. In the drawing figures.

Figure 1:
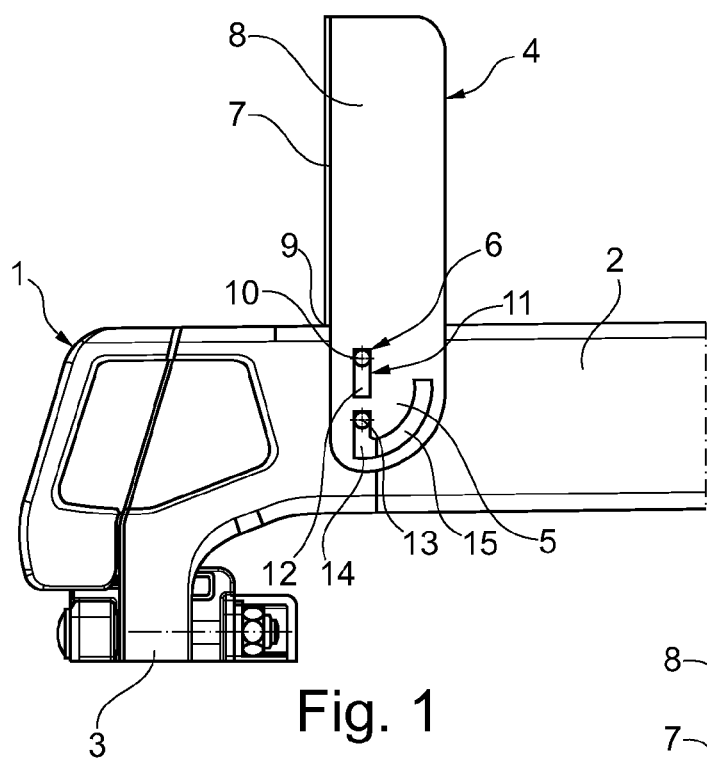
FIG. 1 illustrates a detail of a preferred embodiment of the load carrier in which an angle bracket is shown in its active position.
Figure 2:
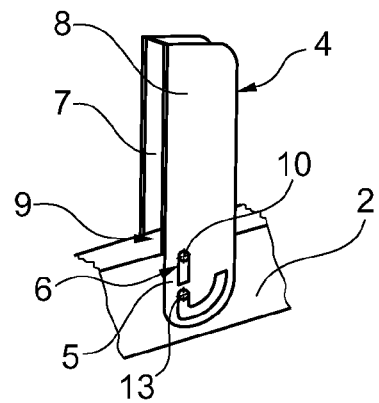
FIG. 2 is a reduced-scale perspective view showing the same embodiment and configuration as FIG. 1.
Figure 3:
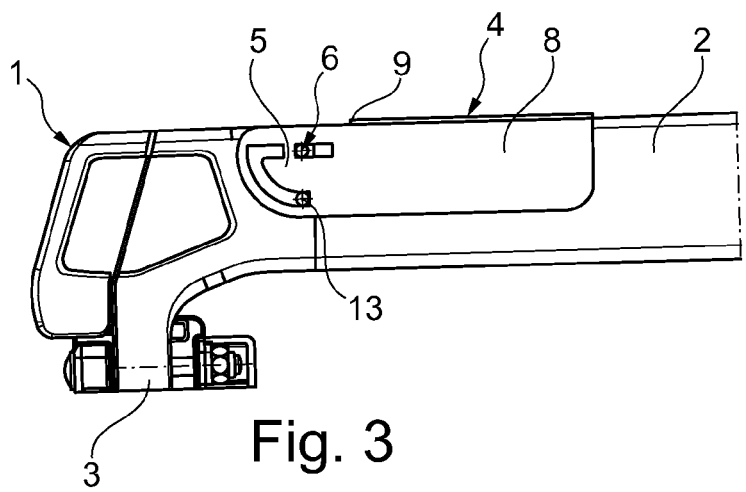
FIG. 3 illustrates the same view as FIG. 1, but wherein the angle bracket adopts its inactive position.
Figure 4:
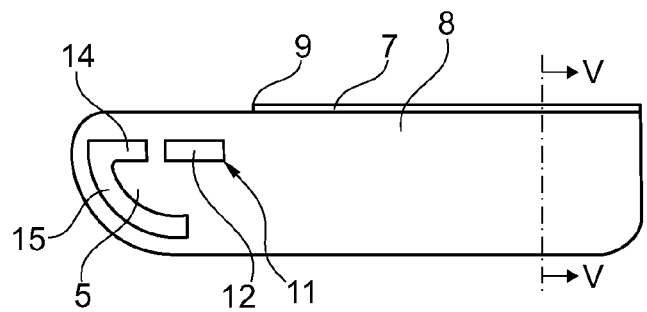

FIG. 4 further illustrates an angle bracket according to the embodiments in FIGS. 1-3.

Figure 5:
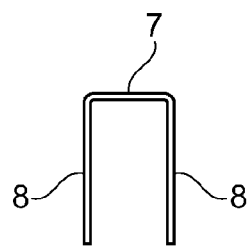

FIG. 5 illustrates a section along the line V-V of FIG. 4.

Figure 6:
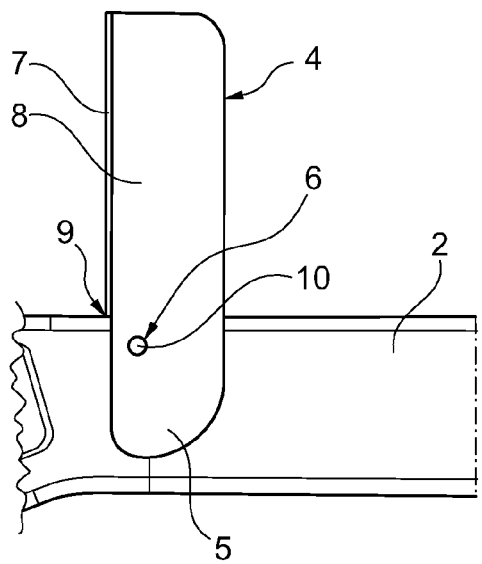

FIG. 6 illustrates a similar view as FIG. 1, but showing a second embodiment of the load carrier.

Figure 7:
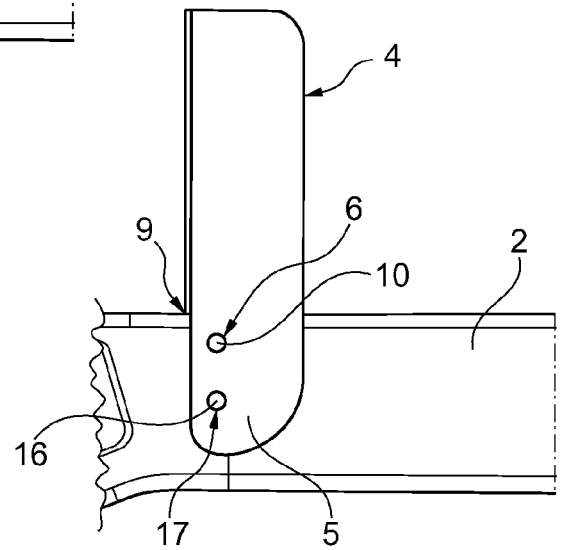

FIG. 7 illustrates a similar view as FIG. 1, but showing a further embodiment of the load carrier.

Reference will now be made in detail to the present preferred embodiments of the load carrier and its associated angle brackets, examples of which are illustrated in the accompanying drawing figures.

DETAILED DESCRIPTION

Reference is now made to FIGS. 1-5, in which the preferred exemplary embodiment of the invention is illustrated. In the illustrated embodiment, the load carrier is provided, in particular, as a roof rack for passenger motor vehicles. It should be appreciated, however, that the roof rack for passenger motor vehicles as shown herein is just one possible embodiment/application of the load carrier and that the load carrier should not be considered as being limited to a roof rack application for passenger motor vehicles.

As shown in FIGS. 1 and 3, the load carrier consists of at least two carrier bridges 1 arranged offset at a distance from one another, of which only the left-hand half of a single carrier bridge is shown in the drawings.

The carrier bridge 1 consists of a crossbar 2 and fastening feet 3 able to be mounted on the vehicle on both sides. At least two angle brackets 4 are provided on the crossbar 2 for securing the objects to be transported, of which only the left-hand angle bracket is shown in the drawings. A further angle bracket, not shown in the drawings, is arranged on the right-hand side of the crossbar 2. That angle bracket is folded in the opposing direction for reaching its active position. The load to be transported is intended to be fastened between these two angle brackets.

The angle brackets 4 have two fastening limbs 5 encompassing the respective crossbar 2. The fastening limbs are able to be pivoted about a common pivot pin 6 provided on the respective crossbar 2.

In the present preferred embodiment shown in the drawings, the crossbars 2 have a substantially rectangular cross section in which the front and rear faces of the crossbars 2 are arranged approximately vertically. For such a profile of the crossbar 2, the angle brackets 4, as shown in FIGS. 4 and 5, are provided with a U-shaped cross section which is formed by a crossmember 7 and arms of the U-shape 8 adjacent thereto. The angle brackets 4 in this case substantially consist of curved sheet metal material that is exceptionally stable due to the U-shaped cross section and provides good support for the load to be transported.

The crossmember 7 of the profile is cut away in the region of the fastening limbs 5. Thus an end edge 9 is produced on the side of the U-shaped profile facing the fastening limbs 5. The end edge in the active position of the respective angle bracket 4 bears against the upper face of the crossbar 2. This end edge 9 forms in cooperation with the upper face of the crossbar 2, therefore, a stop which limits the movement of the angle bracket 4 into the active position in which it adopts a vertical position.

If the angle bracket 4 is pivoted into its inactive position, the arms of the U-shape encompass the front and rear faces of the respective crossbar 2, flush therewith, whilst the crossmember 7 bears against the upper face of the respective crossbar 2. In this inactive position, the angle brackets 4 protrude only by the material thickness of the crossmember 7 over the upper face of the crossbars 2, so as to only pose a negligible cross-section and thus contribute negligible air resistance.

Transverse pins 10 serve as pivot pins 6 for the fastening limbs 5, as shown in FIGS. 1-2. The transverse pins pass through the entire profile of the crossbars 2. Alternatively, the transverse pins 10 may also be split in two so that each transverse pin consists of two short rotary pins, which are inserted and/or screwed from both sides into the crossbars 2.

The portions of the transverse pins and/or the rotary pins 10 protruding over the front and rear faces of the respective crossbar 2 engage in corresponding recesses 11 of the fastening limbs 5 so that, as a result, rotary joints are produced, about which the angle brackets 4 may be pivoted.

In the illustrated embodiment shown in FIGS. 1-3, the recesses 11 of the fastening limbs 5 are configured as sliding slots 12 in the form of elongated holes which extend in the longitudinal direction of the angle brackets 5 and, together with the transverse pin 10 forming the respective pivot pin 6, constitute a rotary joint.

A further stabilizing pin 13 is additionally arranged on the respective crossbar 2 below the pivot pin 6. The stabilizing pin engages in a second elongated hole 14 of the same length, which extends aligned with the sliding slot 12.

From the lower end of the second elongated hole 14 extends a circular arc-shaped elongated hole 15 of the same width. The circular arc-shaped elongated hole 15 has the same width as the elongated hole 14. This circular arc-shaped elongated hole 15 extends over a circular arc of ca. 90° in the direction of the inactive position of the respective angle bracket 4.

If the angle bracket 4 is intended to be pivoted from the inactive position shown in FIG. 3 into the active position shown in FIG. 1, the circular elongated hole 15 slides on the stabilizing pin 13 sufficiently far until the stabilizing pin comes to bear against the side wall of the elongated hole 14. In this position, the angle bracket 4 has already reached its vertical position. Subsequently, the angle bracket 4 is lowered by a light pressure of the hand, so that it adopts the active position shown in FIG. 1. In this position, the angle bracket 4 is secured three ways, namely firstly by the end edge 9 of the crossmember 7 serving as a stop, which then bears against the upper face of the crossbar 2, secondly by the transverse pin 10 located in the sliding slot 12 and thirdly by the stabilizing pin 13 located in the second elongated hole 14. As a result, a particularly secure seat of the angle bracket 4 relative to the crossbar 2 is ensured.

If the angle bracket 4 is to be subsequently pivoted again into its inactive position, it only needs to be pulled slightly upward by hand, so that the lower ends of the elongated holes 12 and 14 come to bear against the pins 6 and 13 and then the angle bracket 4 may be pivoted back, to the right in the drawings, into the inactive position shown in FIG. 3.

In the simplified embodiment of the invention shown in FIG. 6, the respective angle bracket 4 is also able to be pivoted between an inactive position and an active position. In the active position, the outward pivoting movement of the angle brackets 4 is limited in the same manner as in the present preferred embodiment according to FIGS. 1-3, in that the end edge 9 of the crossmember 7 comes to bear against the upper face of the crossbar 2. However, no securing is provided from the active position into the inactive position, in particular such a securing not even being required in various applications. A certain degree of stiffness could eliminate this drawback.

However, in this simplified embodiment, should a stable securing of the angle bracket 4 be required in the direction of the inactive position, according to FIG. 7 the fastening limbs may have on at least one side an additional recess 16 into which a spring-loaded securing pin 17 provided in the crossbar 2 engages, as soon as the angle bracket 4 has reached its active position.

In order to pivot the angle bracket 4 back into its inactive position, if it is no longer required, the securing pin 17 only needs to be depressed so that a pivoting of the angle bracket 4 is possible.

Even in this simplified embodiment, therefore, a securing of the angle brackets 4 in both pivoting directions is possible and namely, on the one hand, by the end edge 9 of the crossmember 7 bearing against the upper face of the crossbar 2 and, on the other hand, by the additional securing pin 17 which engages in the recess 16.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A bridge for a motor vehicle load carrier in the form of a roof rack, comprising a crossbar as well as fastening feet that are able to be mounted on both sides of the vehicle, wherein angle brackets serving as lateral load stops are provided on the crossbar, said angle brackets being able to be pivoted between an active position and an inactive position, characterized in that the angle brackets include two fastening limbs encompassing the crossbar, the fastening limbs being able to be pivoted about a common pivot pin provided on the crossbar, in that the angle brackets in the active position are able to be placed in the vertical position against a stop and in that the angle brackets are able to be folded down in the inactive position onto the crossbar and then bear against said crossbar, and wherein the crossbar is provided with substantially vertically extending front and rear faces, characterized in that the angle brackets have an approximately U-shaped cross section with a crossmember and arms of the U-shape adjacent thereto and in that the arms of the U-shape in the inactive position of the angle brackets encompass the front and rear faces of the crossbar, flush therewith, whilst the crossmember bears against the upper face of the crossbar.

2. The bridge as claimed in claim 1, characterized in that an end edge of the crossmember facing the fastening limbs serves as a stop for the respective angle bracket, said end edge in the active position of the angle bracket bearing against the upper face of the crossbar.

3. The bridge as claimed in claim 2, characterized in that a transverse pin arranged in the respective crossbar and able to be fastened therein is provided as a pivot pin for the fastening limbs, in that the transverse pin protrudes over the front and rear faces of the crossbar and in that the protruding portions of the transverse pin engage in corresponding recesses of the fastening limbs of the angle brackets, forming a rotary joint.

4. A load carrier incorporating the bridge of claim 3.

5. The bridge as claimed in claim 2, characterized in that rotary pins inserted on both sides into the crossbar are provided as a pivot pin for the fastening limbs, in that the rotary pins in the installed state protrude over the front and rear faces of the crossbar, and in that the protruding portions of the rotary pins engage in corresponding recesses of the fastening limbs of the angle brackets, forming a rotary joint.

6. The bridge as claimed in claim 5, characterized in that the rotary pins are screwed laterally from the outside into the crossbar.

7. The bridge as claimed in claim 6, characterized in that the fastening limbs have on at least one side an additional recess and a spring-loaded securing pin provided in the crossbar engaging with said additional recess as soon as the angle bracket has reached the active position.

8. The bridge as claimed in claim 7, characterized in that a plurality of pivot pins are provided, said plurality of pivot pins being distributed over the length of the crossbar, so that the angle brackets are able to be articulated at different points of the crossbar.

9. A load carrier incorporating the bridge of claim 8.

10. A load carrier incorporating the bridge of claim 5.

11. A load carrier incorporating the bridge of claim 6.

12. The bridge as claimed in claim 7, characterized in that a plurality of pivot pins and securing pins are provided, said plurality of pivot points and securing pins being distributed over a length of the crossbar so that the angle brackets are able to be articulated at different points of the crossbar.

13. The bridge as claimed in claim 7, characterized in that the recesses of the fastening limbs are configured as sliding slots in the form of elongated holes which extend in the longitudinal direction of the angle brackets and together with the pivot pin form a rotary joint, in that a stabilizing pin is arranged on the crossbar below the pivot pin, said stabilizing pin engaging in a second elongated hole which extends aligned with the sliding slot and has at least the same length as said sliding slot, and in that from the lower end of the elongated hole extends a circular arc-shaped elongated hole of the same width, said circular arc-shaped elongated hole extending at least over a circular arc of 90° in a direction of the inactive position of the respective angle bracket.

14. The bridge as claimed in claim 7, characterized in that a transverse pin arranged in the respective crossbar and able to be fastened therein is provided as a pivot pin for the fastening limbs, in that the transverse pin protrudes over the front and rear faces of the respective crossbar and in that the protruding portions of the transverse pin engage in corresponding recesses of the fastening limbs of the angle brackets, forming a rotary joint.

15. The bridge as claimed in claim 14, characterized in that a plurality of pivot pins and stabilizing pins are provided, said pivot pins and said stabilizing pins being distributed over the length of the crossbar, so that the angle brackets are able to be articulated at different points of the crossbar.

16. A load carrier incorporating the bridge of claim 7.

17. A load carrier incorporating the bridge of claim 2.

18. A load carrier incorporating the bridge of claim 1.

\* \* \* \* \*